United States Patent [19]

Arblaster

[11] 4,024,741

[45] May 24, 1977

[54] COMBINATION LOCK PERMANENTLY INSTALLABLE BY SELF-GRIPPING MOUNTING MEANS

[76] Inventor: Dennis Arblaster, 34081 La Serena, Dana Point, Calif. 92629

[22] Filed: Feb. 10, 1975

[21] Appl. No.: 548,592

[52] U.S. Cl. .................................... 70/233; 70/58
[51] Int. Cl.² ........................................ B62H 5/00
[58] Field of Search ............ 70/38 C, 53, 93, 233, 70/234, 312, 370, 443, 23, 25, 26, 58; 151/35; 285/340, DIG. 3; 292/263, 264, DIG. 53; 403/105, 202, 203, 365, 372; 85/80, 81

[56] References Cited

UNITED STATES PATENTS

| | | | |
|---|---|---|---|
| 502,307 | 8/1893 | Lowrie | 70/25 |
| 1,391,378 | 9/1921 | Gaston | 151/35 |
| 1,991,825 | 2/1935 | Strickland | 70/233 |
| 2,264,480 | 12/1941 | Owen | 403/296 |
| 2,496,320 | 2/1950 | Vickers | 70/38 C |
| 2,717,512 | 9/1955 | Sterling et al. | 70/100 |
| 2,950,937 | 8/1960 | Bedford | 403/372 |
| 3,081,616 | 3/1963 | Mintz | 70/93 |
| 3,354,675 | 11/1967 | Quigg | 70/58 |
| 3,667,794 | 6/1972 | Lentz | 292/264 |
| 3,800,575 | 4/1974 | Perret | 70/233 |

*Primary Examiner*—Robert L. Wolfe
*Attorney, Agent, or Firm*—Sellers and Brace

[57] ABSTRACT

An improved anti-theft locking device permanently and quickly securable to various objects by self-contained concealed fastener means sized to have an interference locking fit with a mounting bore such as the interior of a cycle handlebar or the like. The locking bolt may be secured to one end of a flexible cable normally stored and concealed in the handlebar and the major length of which is withdrawable therefrom when used to lash the cycle to a fixed object. The outer end of the cable is fixed to the locking bolt and this bolt is invertable so that either end is insertable into the locking mechanism depending upon whether or not the cable is in use. A variant embodiment of the invention is readily installed between a door and its casing and may utilize a linkage in lieu of a flexible cable as a part of the anchor subassembly.

8 Claims, 15 Drawing Figures

COMBINATION LOCK PERMANENTLY INSTALLABLE BY SELF-GRIPPING MOUNTING MEANS

This invention relates to an anti-theft device and more particularly to an improved combination lock readily permanently installable in the end of a handlebar or the like bore by a novice and utilizing the handle bar to store a cable attached to the lock and usable to lash a cycle to a fixed object.

Many expedients have been proposed for locking doors closed and securing a movable object, such as a cycle, to an immovable object ot thwart unauthorized entry or use of the object to be protected against theft. All are subject to shortcomings and disadvantages obviated by the present invention.

This invention features a keyless lock provided with automatic self-gripping means greatly facilitating the permanent installation of the lock by the novice in its operating environment. One embodiment is readily installable in a tubular component of the item to be locked as, for example, within the handlebar of a cycle. When the cable is not in use, an enlargement on the innermost end of the cable limits its withdrawal from the tubular mounting member. The other or outer end of the cable is secured to the lock bolt of the combination lock mechanism. Either end of the lock bolt is insertable into the locking mechanism and includes an open groove along one side seating a length of the cable. This permits the lock bolt to be withdrawn and the extended end of the cable to be looped about a fixed object following which one leg of the cable loop is seated in the groove of the locking bolt and then the locking bolt is inserted into the locking mechanism and relocked by rotating the combination collars.

The main body of the lock is encircled by a multiplicity of resilient sharp edged protrusions sized to have an interference fit with the bore walls in which the lock is installed. These protrusions are deflected from a generally radial position as the lock is forcibly telescoped into the installation bore and, in consequence, the sharp edges of the retaining protrusions are positioned to bite into the bore wall instantly that an attempt is made to withdraw the lock from the bore. If the lock is to be mounted on a door or gate a flanged tube is first installed in the door and in the casing. The locking mechanism is then inserted from the unflanged end to complete the permanent installation of the locking mechanism in the door. The locking bolt may be connected to the door casing in using a similarly designed anchorage sub-assembly or in any other suitable manner.

Accordingly, it is a primary object of the present invention to provide an improved, anti-theft device readily and permanently installable by a novice in its operating environment.

Another object of the invention is the provision of an anti-theft device having a locking mechanism equipped with self-gripping means for holding it permanently installed in a mounting bore therefor.

Another object of the invention is the provision of an anti-theft device permanently installable by a novice in one end of a tubular member such as a cycle handlebar.

Another object of the invention is the provision of an anti-theft device mountable in a cycle handlebar and utilizing a flexible cable loopable about a fixed object when in use and which cable is normally stored fully concealed within the handlebar when not in use.

Another object of the invention is the provision of an anti-theft device employing a combination lock and having a locking bolt attached to one end of a cable extending through and held captively assembled to the locking mechanism, either end of the locking bolt being insertable and lockable to the locking mechanism.

Another object of the invention is the provision of a combination lock permanently installable in a door and having a locking bolt flexibly connected to means permanently mountable in a door casing.

Another object of the invention is the provision of a simple, compact locking device operable without a key and equally suitable for use with portable objects such as cycles and lawn mowers or with stationary objects such as lockers, garages, and the like.

Another object of the invention is the provision of a locking accessory mountable permanently in an operating environment by mounting expedients fully concealed and inaccessible to persons endeavoring to remove or disassemble the lock.

Another object of the invention is the provision of a combination lock having a locking bolt permanently assembled to one end of a cable wrappable about a fixed object and either end of which bolt may be reassembled and locked in place in the locking mechanism.

These and other more specific objects will appear upon reading the following specification and claims and upon considering in connection therewith the attached drawing to which they relate.

Referring now to the drawing in which a preferred embodiment of the invention is illustrated:

Figure 1:
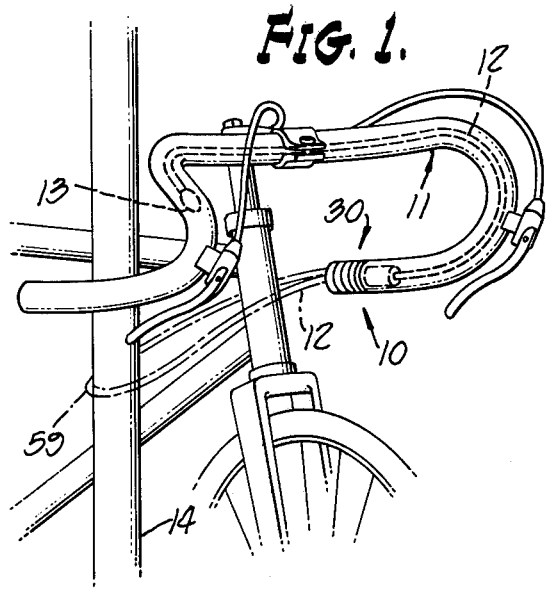
FIG. 1 is a fragmentary perspective view of a bicycle showing one preferred embodiment of the invention anti-theft device installed in the handlebar and indicating in dot and dash line the manner in which the flexible cable of the device is looped about a fixed pole with the locking bolt locked to the handlebar.

Referring initially more particularly to FIGS. 1 through 11, there is shown a first preferred embodiment of the anti-theft locking device designated generally 10. FIG. 1 shows the device permanently installed in one end of a cycle handlebar 11 with the flexible tie means or tension member such as cable 12 stored within the handlebar and fixed to one end of the locking bolt. The remote free end of the cable is provided with an enlargement 13 which is engageable with the inner end of the main body of the locking device to limit withdrawal of cable 12 when in use to lock the cycle to a post. The locking bolt will be described in detail presently and is withdrawable from the locking device when the combination lock is unlocked. It will be understood that the bolt is then withdrawn along with the major length of the flexible cable and looped about a fixed object, such as post 14, following which the locking bolt is inverted end for end, reinserted in the combination lock, and relocked, all in accordance with constructional details which will now be described.

Figure 2:
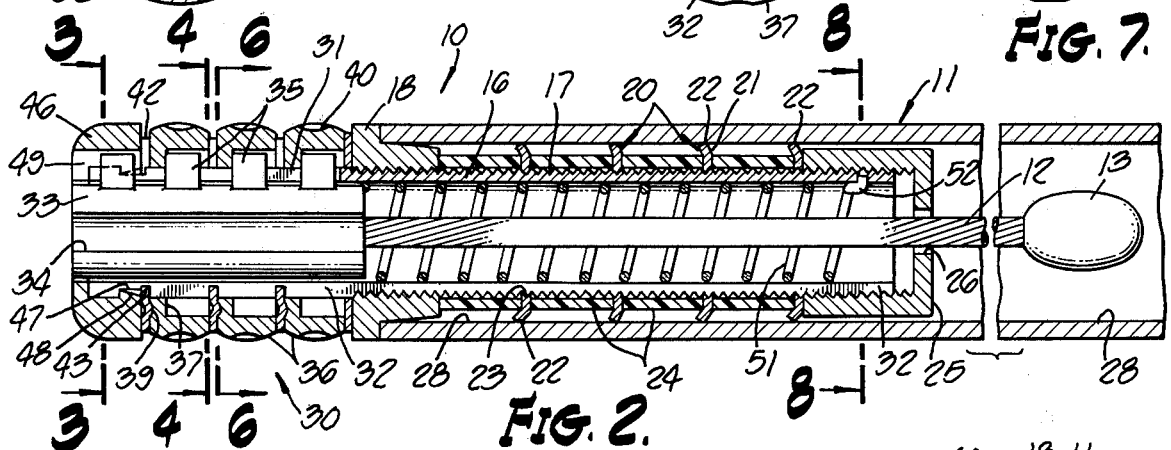
FIG. 2 is a longitudinal sectional view on an enlarged scale through the device shown in FIG. 1 and indicating the position of the parts when the flexible cable is stored within the handlebar.
Figure 11:
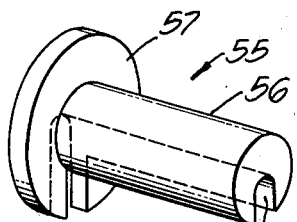
FIG. 11 is a perspective view of a protective impact member which may be inserted in the outer end of the lock in lieu of the locking bolt while forcibly installing the device in the end of a handlebar.

Referring now more particularly to FIG. 2 showing the end of the handlebar 11 supporting locking device 10, it is pointed out that device 10 has a tubular main body 16 threaded along the major portion of its right hand end. A flanged bushing 18 sized to seat flush against the end of the handlebar when the device is fully installed in the handlebar is assembled to the left hand end of threads 17.

Figure 9:
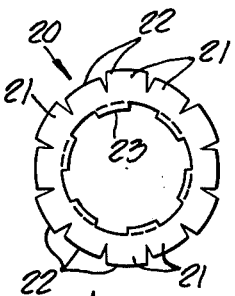
FIG. 9 is an end view of one of the retainer rings employed to hold the locking device permanently installed in its operating environment.

Self-gripping means effective to hold locking device 10 permanently installed in handlebar 11 preferably comprises a plurality of retainer rings 20, 20 formed from tempered sheet spring stock such as high carbon tempered steel, have the constructional details best shown in FIG. 9. The inner and outer peripheries of rings 20 are notched as shown in FIG. 9 to provide a plurality of outwardly projecting protrusions 21 and a plurality of relatively short inwardly projecting lugs 23 slightly twisted from the plane of the ring in an amount corresponding to the pitch of thread 17. Accordingly, it will be understood that rings 20 are readily threaded onto the threads 17 along the inner end of the main body 16 and are preferably supported and reinforced by the intervening plastic spacer rings 24. These several elements are held in assembled position on the main body by a threaded cap nut 25 having a radial slot 26 to receive and loosely accommodate cable 12.

The transverse outer ends of the generally radially disposed protrusions 21 have sharp edges 22 and alternate ones of these protrusions differ slightly in length. The diametric distance between oppositely disposed ones of these sharp edges prior to assembly of the device into its operating environment is substantially greater than the corresponding distance between the interior sidewalls of the mounting bore for the device. As shown in FIGS. 1-10, this mounting bore is formed by the interior sidewall 28 of the cycle handlebar 11. Prior to the telescopic assembly of locking device 10 into the mounting bore 28, protrusions 21 project substantially radially outward from main body 16. However, as the locking device is forced into mounting bore 28 it will be recognized that the protrusions 21 are deflected toward the left as viewed in FIG. 2 forcing the sharp edges 22 of the protrusions into high pressure contact with the interior surface of bore 28. Accordingly, any attempt made to withdraw the device from the mounting bore tends to restore the protrusions and thereby to cause the sharp edges to bite into the bore wall with great power. It is found that the protrusions of even a single one of the retainer rings 20 is fully adequate to hold the locking device permanently installed in the bore. Desirably, however, a plurality of the retainers are used and since the protrusions preferably differ slightly in radial length, it is readily apparent that this expedient enables the retainer rings to accomodate a wider range of tolerance variations in the internal diameter of bore 28 than would otherwise be the case.

Figure 3:
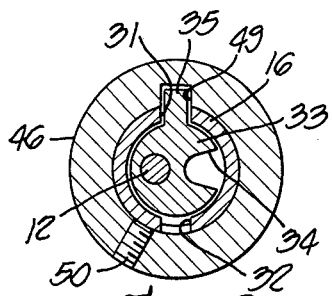
FIG. 3 is a cross-sectional view taken along line 3—3 on FIG. 2.
Figure 4:
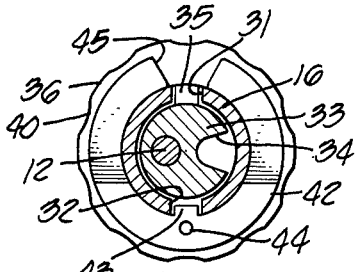
FIG. 4 is a cross-sectional view taken along line 4—4 on FIG. 2.
Figure 5:
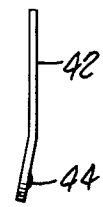
FIG. 5 is an edge-elevational view of a typical keeper ring for one of the locking collars.
Figure 8:
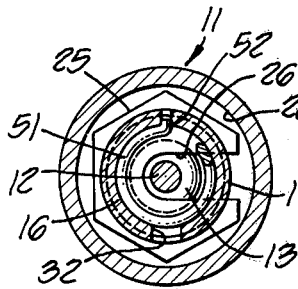
FIG. 8 is a cross-sectional view taken along line 8—8 on FIG. 2.
Figure 6:
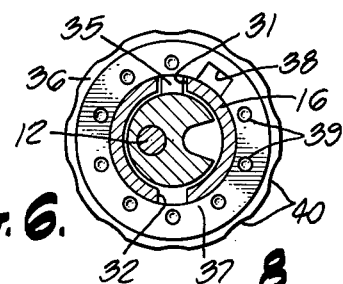
FIG. 6 is a cross-sectional view taken along line 6—6 on FIG. 2.
Figure 7:
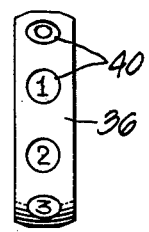
FIG. 7 is an edge elevational view of one of the locking collars.

The combination lock mechanism per se, designated generally 30, will now be described with particular reference to FIGS. 2 through 10. As is best shown in FIGS. 3, 4 and 6, the outer or left hand end of the main body 16 is provided with a pair of diametrically opposed slots 31,32. Slot 31 terminates and is restricted to the non-threaded outer end of the main body 16 but slot 32 extends the full length of the main body for a purpose to be described presently. Lock 30 has a cylindrical locking bolt 33 formed with a deep open-ended groove 34 extending the full length thereof. One end of the flexible cable 12 is firmly fixed to one end of the lock bolt in an area offset from the bottom of groove 34. As clearly appears in FIGS. 2 and 10, locking bolt 33 is provided with a row of four identical locking lugs 35 similarly spaced from one another and from each end of the locking bolt. These locking lugs are freely slidable lengthwise of slot 31.

The means for releasing or retaining the locking lugs 35 of bolt 33 comprises three identical locking collars 36, the details of which are best shown in FIGS. 2, 6, 7 and 10. Each collar has a short inwardly projecting radial flange 37 (FIG. 10) provided with a single notch 38 (FIG. 6) sized to pass locking lugs 35 when notch 38 is in the 2 o'clock position as viewed in FIGS. 2, 6 and 10, but to retain the locking bolt against withdrawal when notch 38 is in any other rotary position. The outer face of flange 37 is provided with a ring of depressions 39 (FIG. 6) cooperating with a complementally shaped portion of a detent spring to be described presently to hold the locking collars in any one of ten different positions corresponding with the lock combination digits 0 to 9 indicated at 40 in FIG. 7. These digits are imprinted, molded or otherwise formed on the outer periphery of the locking collars in accordance with customary practice.

Retainer springs for holding locking collar 36 firmly in any one of their ten possible positions comprise a thin spring ring 42 (FIGS. 4 and 5) positioned against the left hand end of the locking collars as viewed in FIG. 2. These retainer springs are restrained from rotation by inwardly projecting lugs 43 which extend into slot 32 of the main body 16. The adjacent portion of ring 42 is provided with a semi-spherical detent 44 which seats in one of the depressions 39 of the locking collar 36 in the manner clearly shown in FIGS. 2 and 10 to hold the associated one of the locking collars in any of its 10 adjusted positions. The diametrically opposed side of the spring rings 42 is cut away at 45 (FIG. 4) so as not to interfere with the passage of the locking lugs 35 along slot 31.

Figure 10:
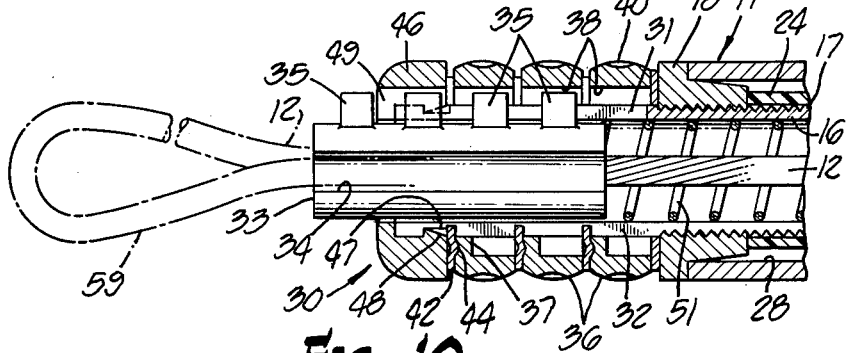
FIG. 10 is a fragmentary view of the lefthand end of FIG. 2 showing the locking bolt partially extended from its locked position and indicating by dot and dash line a loop in the cable when the locking bolt is inverted end for end with one leg of the loop seated in the groove along one side of the locking bolt.
Figure 12:
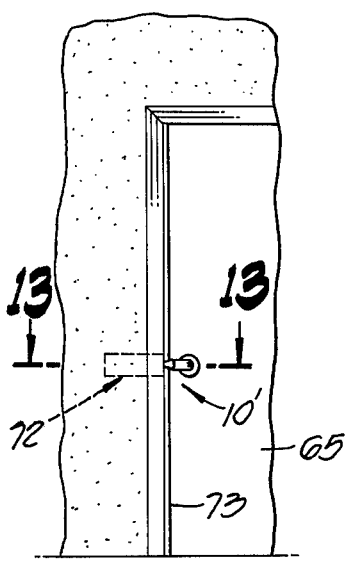
FIG. 12 is a fragmentary elevational view of a closed garage equipped with a second preferred embodiment of the anti-theft device.
Figure 14:
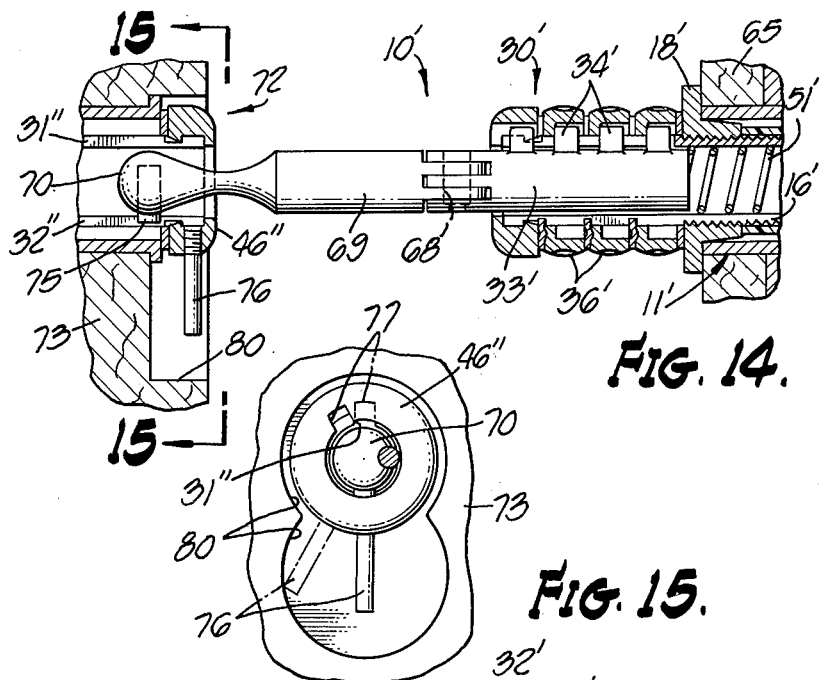
FIG. 14 is a fragmentary cross-sectional view taken along the broken line 14—14 on FIG. 13.
Figure 15:
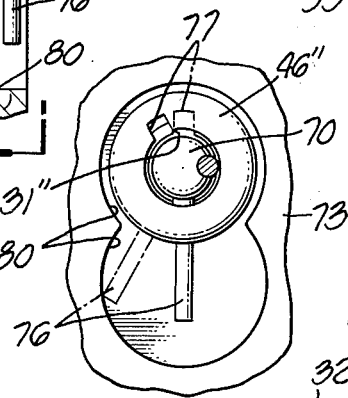
FIG. 15 is a fragmentary cross-sectional view taken along line 15—15 on FIG. 14.

Locking collars 36 and retainer springs 42 are held assembled on the outer end of the main body tube 16 by an assembly collar 46. As shown in FIG. 10, the outer end of tube 16 is formed with a shallow encircling groove 47 which seats an inwardly projecting saw-tooth shaped flange 48 formed on the inner lip edge of the cup-shaped assembly collar 46. The outwardly flaring surface of flange 48 serves as a pilot to guide this flange into its assembly position in groove 47. During this forcible assembly operation slots 31,32 permit the resilient tube 16 to flex inwardly momentarily until flange 48 seats in groove 47. The inwardly projecting flange on the outer end of collar 46 then seats flush against the outer end of tube 16. Collar 46 has a notch 49 freely accommodating the locking lugs 35 of the locking bolt. This notch is held in alignment with slot 31 of tube 16 by a set screw 50 (FIG. 3).

Loosely enclosed along the inner end of main body tube 16 is a compression spring 51 having its end 52 seated in an opening of the main body. The left hand end of spring 51 bears against locking bolt 33 and serves to urge this bolt outwardly when locking collars 36 are unlocked. Accordingly, whenever the lock is closed spring 51 is under compression stress.

Locking device 10 is readily installed by the novice in the end of a bore such as one end of a cycle handlebar 11. For this purpose locking bolt 33 is first detached and replaced by a nylon installation impact member 55 shown in FIG. 11. Impact member 55 has a shank 56 and an impact head 57. Shank 56 is of the same general diameter as bolt 33 and is formed with a slot 58 extending from end to end sized to receive cable 12. Member 56 is inserted into the outer end of lock mechanism 30 until its head 57 rests against assembly collar 46. A mallet or other tool may then be used to forcibly insert the locking device into the mounting bore 28 of handlebar 11 until bushing 18 is firmly seated against the outer end of this bore. During this asembly operation, protrusions 21 of retainer rings 20 are deflected to the position shown in FIG. 2 with the sharp outer edges 22 thereof biting into the sidewall of bore 28 the longer protrusions being deflected more than the shorter ones. The locking device is now permanently installed in the bore and cannot be withdrawn and installation member 55 may be withdrawn and discarded.

The operator then pushes the flexible tie means 12 inwardly into its stored position along the interior of the handlebar. The final operation is to insert locking bolt 33 into the outer end of the combination lock 30. When its outer end is flush with the outer end of assembly collar 46 the locking collars 35 may be rotated to any position such that the notches 38 are misaligned with locking lugs 35 of bolt 33.

To use device 10 to lock the cycle to a post 14, the operator rotates each of the locking collars to the appropriate position bringing the respective notches 38 into alignment with the locking lugs 35. As soon as the last collar has been rotated into this position, spring 51 ejects the locking bolt to a position in which it is readily grasped by the user's fingers. The cable is then withdrawn and looped about a fixed object such as post 14. The end of the bolt not attached to cable 12 will now face toward the outer end of its receiving passage in locking mechanism 30. While in this position the leg of cable loop 59 (FIG. 10) not attached to bolt 33 is laid into groove 34. This having been done the locking bolt can now be re-inserted into its assembly position within the lock and locked in place by collar 36.

FIG. 10 shows the cable extended and formed into a loop 59 with the leg thereof attached to the portion of the cable within the handlebar seated in groove 34 of the locking bolt. The other leg of loop 59 is of course attached to the outer end of the locking bolt. As the locking bolt is held pressed inwardly against spring 51, the locking collars 36 are rotated into locking position. Cable 12 will be substantially fully withdrawn from the handlebar with the enlargement 13 on its inner end held against withdrawal by contact with end cap 25.

After again unlocking the combination lock 30 the locking bolt is withdrawn and inverted end for end before being restored into the locking mechanism with the end thereof attached to cable 12 innermost.

Referring to FIGS. 12–15 there is shown a second preferred embodiment of the invention anti-theft locking device designed for use in locking an overhead garage door 65 closed. It will be understood that the same or similar parts corresponding to the first described embodiment are designated by the same reference numerals but distinguished by the addition of a prime. This embodiment includes an anchorage subassembly for the locking bolt which subassembly has components corresponding to those of the first embodiment and these are designed by the same reference numerals and a double prime.

Figure 13:
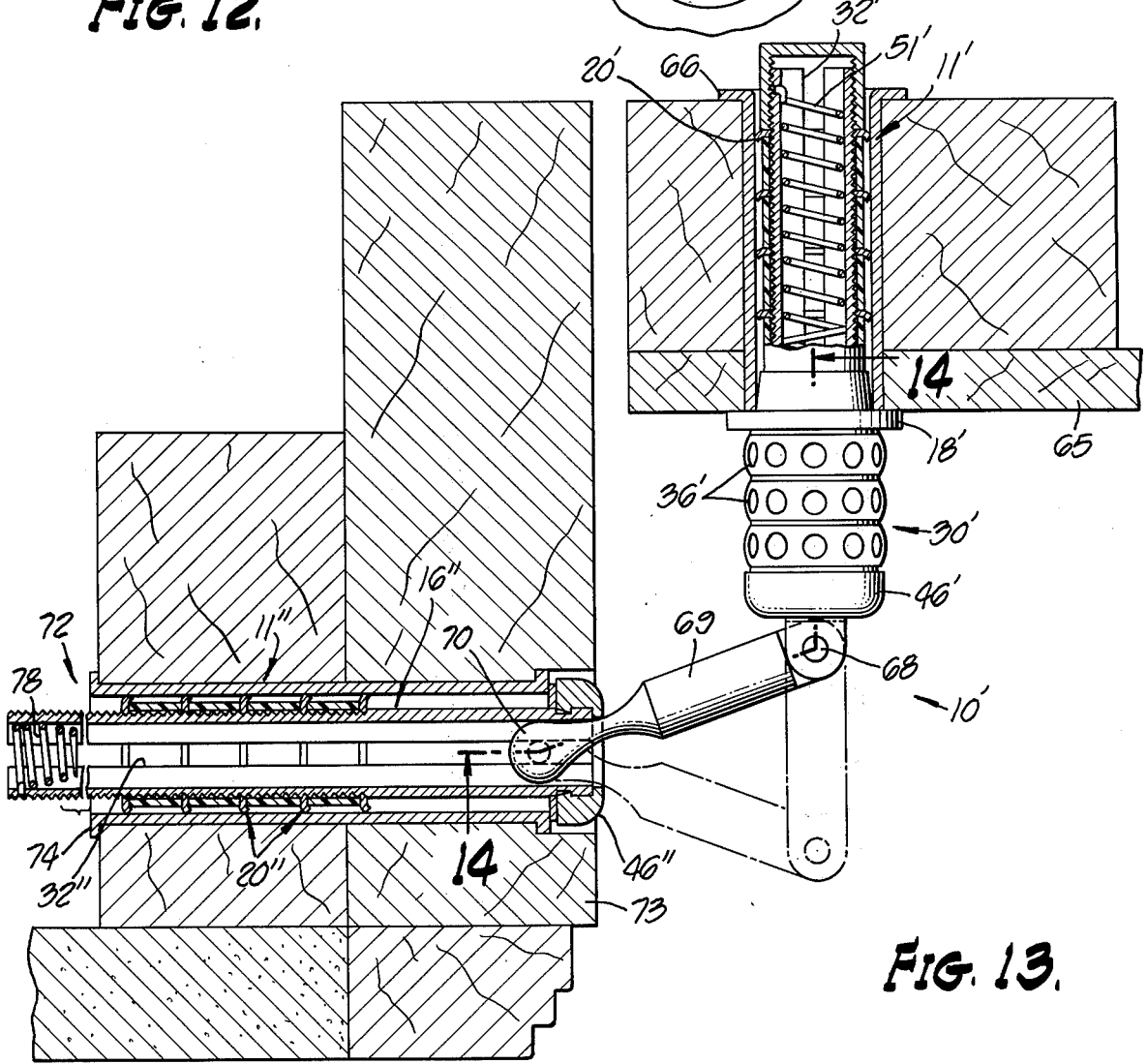
FIG. 13 is a fragmentary cross-sectional view on an enlarged scale taken along line 13—13 on FIG. 12.

Referring to FIG. 13 it will be understood that the combination lock subassembly 30' is installed in door 65. This installation is made using a flanged tube 11' inserted into a bore through the door with the flange 66 seated against the rear surface of door 65. The flange of bushing 18' is sufficiently large in diameter to lie flush against the exterior surface of door 65. The combination lock 30' is constructed as described above and is installed and permanently retained within the bore of tube 11' in the same manner previously described.

Locking bolt 33' (FIG. 14) is pivotally connected by a roll pin 68 to a link 69 having its left hand end 70 generally pear-shaped with its larger diameter portion having a close sliding fit with the bore of a tube 16" similar in construction to main body tube 16' and forming part of an anchorage assembly designated generally 72 installed in the door casing 73. It will be understood that the main body tube 16" of the anchorage is constructed in the same manner described above in connection with the main body of locking device 10 and is retained permanently installed therein as described above in connection with FIGS. 1–9. The flanged end of this tube is inserted in a bore through the door casing and the inner end is then beaded over with a flaring tool as indicated at 74.

Self-gripping retainer rings 20" are constructed in the same way as retainer rings 20 and their transverse sharp outer edges bite into mounting tube 11" upon any attempt to withdraw this sub-assembly from the mounting tube.

Projecting radially from the end 70 of link 69 is a stop pin which projects into and slides along slot 32" of tube 16" thereby retaining link 69 captive within slot 32" and prevents rotation of link 69 and lock bolt 33'. The shorter upper slot 31" extends only a short distance lengthwise of the outer end of tube 16" and serves to store the locking lugs 34' of lock bolt 33' therein when this bolt is disengaged from locking mechanism 30'. In other words it will be understood that when the locking bolt is disengaged from mechanism 30' this bolt together with link 69 is slid lengthwise into tube 16" and stored therein until it is desired to again lock the door closed.

To hold link 69 and bolt 33' so stored, assembly collar 46" of the anchorage assembly is constructed in the same manner as assembly collar 46 but in lieu of the set screw 50 (FIG. 3) there is inserted a longer shouldered pin 76, the shoulder preventing the threaded inner end of this pin from engaging tube 16". Accordingly, the collar 46" is free to rotate about the outer end of tube 16". Collar 46" also has a notch 77 sized to freely pass lugs 34' of locking bolt 33'. Collar 46" and its pin 76 are located in a FIG.-8 counterbore 8-formed in door casing 73 are are rotatable between the full line and dot and dash line positions of pin 76 shown in FIG. 15. So long as pin 76 is in its upright 6 o'clock position, notch 77 is in the 11 o'clock position and misaligned with slot 31" and is therefore unable to receive the lugs 34' of the locking bolt. However, when pin 76 is rotated to the dot and dash line position, notch 77 will be in a 12 o'clock position, aligned with slot 31" and properly positioned to receive the locking lugs 34' of locking bolt 33'. When this bolt has been substantially fully telescoped into tube 16" the operator rotates pin 76 and collar 46" counterclockwise so that notch 77 is again in the 11 o'clock position to retain the locking bolt captive. When so stored, the inner end 70 of link 69 bears against and compresses coil spring 78 at the inner end of tube 16". The garage door may be pivoted upwardly to its open position without interference from bolt 33' and link 69.

It will be understood that the combination lock 30' functions in precisely the same manner described above and then when it is again desired to lock the door closed, the operator simply lowers the door, then rotates pin 76 clockwise to align notch 77 with the locking lugs 34'. Coil spring 78 then ejects the locking bolt so that it can be grasped by the operator and reinserted and locked in locking mechanism 30' to relock the garage door in closed position.

From the foregoing it will be recognized that in each embodiment of the anti-theft device the locking bolt of the combination lock is attached to tie means which may include a flexible cable, a linkage, chain or the like. This tie means may pass centrally through the locking mechanism as in FIGS. 1–10, or it may have the end remote from the locking bolt anchored to some stationary point as it is in FIGS. 12–15.

While the particular improved combination lock permanently installable by self-gripping mounting means herein shown ad disclosed in detail is fully capable of attaining the objects and providing the advantages hereinbefore stated, it is to be understood that it is merely illustrative of the presenty preferred embodiment of the invention and that no limitations are intended to the detail of construction or design herein shown other than as defined in the appended claims.

I claim:

1. A locking device permanently securable to one end of a cycle handle bar and adapted to lock the cycle to a fixed object when not in use comprising, an elongated tubular main body having generally radially disposed strong but flexible protrusions projecting therefrom and having a sharp edge extending transversely of their free outer ends, said protrusions being sized to have a forced telescopic fit with the interior wall of a handle bar upon insertion axially therealong with said sharp edges biting into said wall to positively prevent withdrawal of said lock device, combination lock mechanism on the outer end of said lock device including a locking bolt lockable within the outer end of said main body when either end thereof is inserted into the outer end of said tubular main body, flexible tie means slidably supported axially of said tubular main body and normally storable within a cycle handle bar when not in use, means preventing full withdrawal of said tie means from said lock device, the outer end of said tie means being anchored to said locking bolt, and a seating groove for said tie means along one side of said locking bolt to seat a length of said tie means when said tie means is in use to lock a cycle to a fixed object.

2. A cycle anti-theft device permanently installable in one end of a cycle handle bar, said device having a tubular main body having means for permanently securing the same to one end of a cycle handle bar and provided at the other end thereof with a combination lock means having a removable locking bolt, flexible tie means extending loosely through said main body and including means at one end preventing full withdrawal of said tie means from said main body and having the other end thereof fixed to said locking bolt, said locking bolt being lockable in assembled position to said locking device when either end is inserted into the outer end of said tubular main body, and seating passage means for said tie means along the exterior of said locking bolt to seat a midlength portion thereof when said tie means is in use to lock a cycle to a fixed object.

3. An anti-theft device as defined in claim 2 characterized in that said permanent assembly means comprises means carried by one end of said tubular main body having a forced interference fit with the interior surface of a handle bar and shaped to flex and offer minimum resistance to the initial insertion movement but to bite into the handle bar and lock said main body against withdrawal from the handle bar.

4. An anti-theft device as defined in claim 3 characterized in that said permanent assembly means comprises a plurality of rings secured about the exterior of one end of said tubular main body and having resilient protrusions with sharp-edged outer ends flexing so as to glide over the interior surface of the handle bar during insertion into the handle bar with said sharp edges positioned to dig into said wall automatically in response to any withdrawal movement of said main body.

5. An anti-theft device as defined in claim 4 characterized in that the exterior of one end of said main body is threaded, and the inner rims of said rings of resilient protrusions being seated in the grooves between adjacent convolutions of said thread.

6. An anti-theft device as defined in claim 5 characterized in the provision of spacer means closely embracing said threaded main body and cooperating therewith to hold said rings of protrusions spaced apart axially of said main body.

7. An anti-theft device as defined in claim 2 characterized in that said tie means is normally concealed within a cycle handle bar when not in use to lock the cycle to a fixed object.

8. An anti-theft device as defined in claim 2 characterized in the provision of spring means concealed within said main body and held in stressed condition while said locking bolt is locked assembled within one end of said main body, and said stored stress being effective to project said locking bolt out of the locked position thereof when released by manipulation of said combination lock means.

* * * * *